(12) United States Patent
Tang

(10) Patent No.: US 8,257,851 B2
(45) Date of Patent: Sep. 4, 2012

(54) BATTERY COVER LATCH MECHANISM AND PORTABLE ELECTRONIC DEVICE USING THE SAME

(75) Inventor: Liu Tang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 398 days.

(21) Appl. No.: 12/574,971

(22) Filed: Oct. 7, 2009

(65) Prior Publication Data

US 2010/0167114 A1 Jul. 1, 2010

(30) Foreign Application Priority Data

Dec. 31, 2008 (CN) .......................... 2008 1 0306748

(51) Int. Cl.
*H01M 2/10* (2006.01)
(52) U.S. Cl. ........................................................ 429/97
(58) Field of Classification Search .................... 429/96, 429/99, 100, 175, 97
See application file for complete search history.

(56) References Cited

U.S. PATENT DOCUMENTS

| 7,419,742 B2 | 9/2008 | Liu et al. |
| 7,441,813 B2 | 10/2008 | Qin et al. |
| 2006/0166083 A1 * | 7/2006 | Zhang et al. .................... 429/97 |

FOREIGN PATENT DOCUMENTS

| CN | 100379161 C | 4/2008 |
| CN | 100395903 C | 6/2008 |
| TW | M272243 A | 8/2005 |
| TW | M273826 A | 8/2005 |
| TW | M280542 A | 11/2005 |
| TW | M300372 A | 11/2006 |

* cited by examiner

*Primary Examiner* — Ula C. Ruddock
*Assistant Examiner* — Thomas H. Parsons
(74) *Attorney, Agent, or Firm* — Altis Law Group, Inc.

(57) ABSTRACT

A battery cover latch mechanism includes a housing, a battery cover, and a latching part. The housing includes a clasp positioned thereon. The battery cover includes a guiding portion and a resisting block facing the guiding portion. The latching part includes a button and a resilient bar assembled on the battery cover. The button includes a hook resisting the resisting block. The button slidably and releasably latches to the clasp to lock the battery cover to the housing or release the battery cover from the housing. The invention also discloses a portable electronic device using the battery cover latch mechanism.

8 Claims, 5 Drawing Sheets

BATTERY COVER LATCH MECHANISM AND PORTABLE ELECTRONIC DEVICE USING THE SAME

BACKGROUND

1. Technical Field

The present disclosure relates to battery cover latch mechanisms used in portable electronic devices.

2. Description of Related Art

Portable electronic devices usually include latch mechanisms to latch battery covers to housings. The latch mechanisms are required to allow frequent installation and removal of batteries.

A typical latch mechanism includes a pair of hooks at one end of the battery cover and a locking pin protruding from the other end of the battery cover. The housing defines a pair of grooves and a locking hole. In assembly, the hooks are inserted into the grooves. The battery cover is pressed down to the housing until the locking pin is inserted into the locking hole. However, during disassembly, a large force is needed to remove the battery cover from the housing. Therefore, it is inconvenient to install or remove a battery.

Therefore, there is a room for improvement within the art.

BRIEF DESCRIPTION OF THE DRAWINGS

Many aspects of battery cover latch mechanism and portable electronic device using the battery cover latch mechanism can be better understood with reference to the following drawings. The components in the drawings are not necessarily to scale, the emphasis instead being placed upon clearly illustrating the principles of the present battery cover latch mechanism and the portable electronic device using the battery cover latch mechanism. Moreover, in the drawings, like reference numerals designate corresponding parts throughout the several views.

DETAILED DESCRIPTION OF THE EMBODIMENTS

Figure 1:
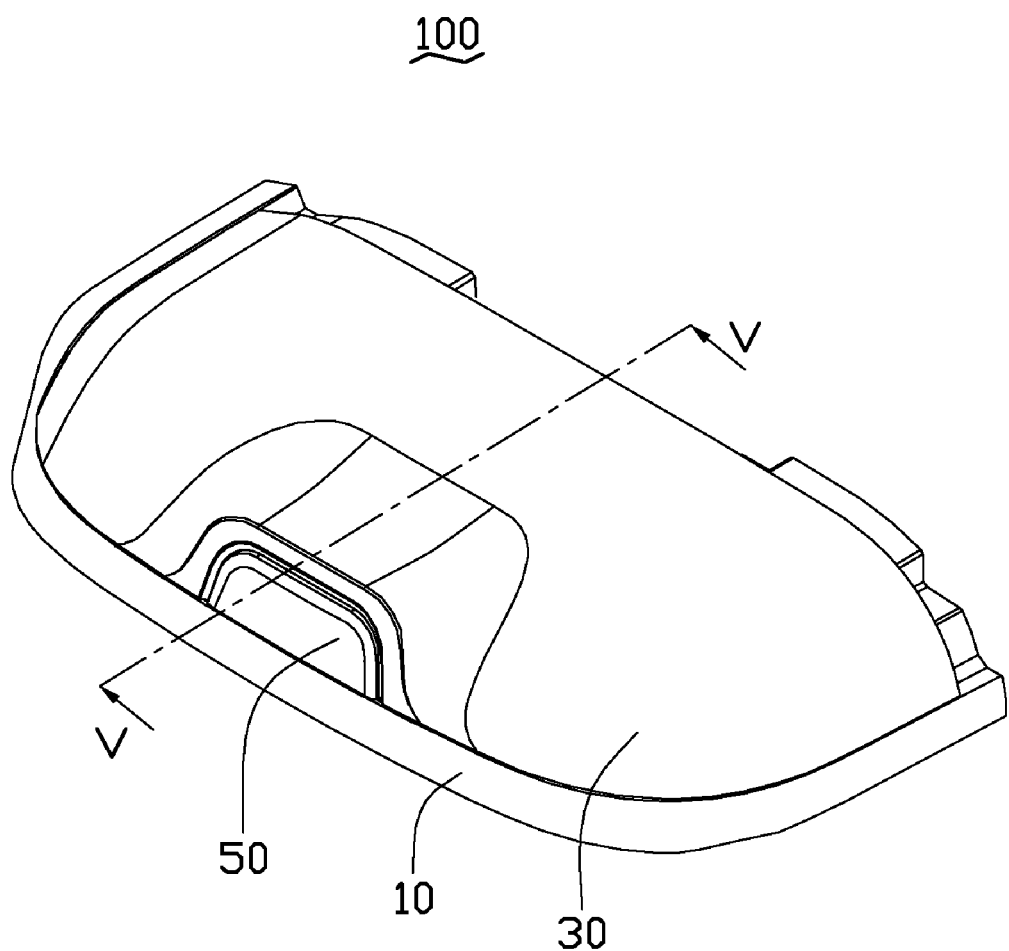
FIG. 1 is a partial and assembled view of a portable electronic device using a battery cover latching mechanism according to an exemplary embodiment.
Figure 2:
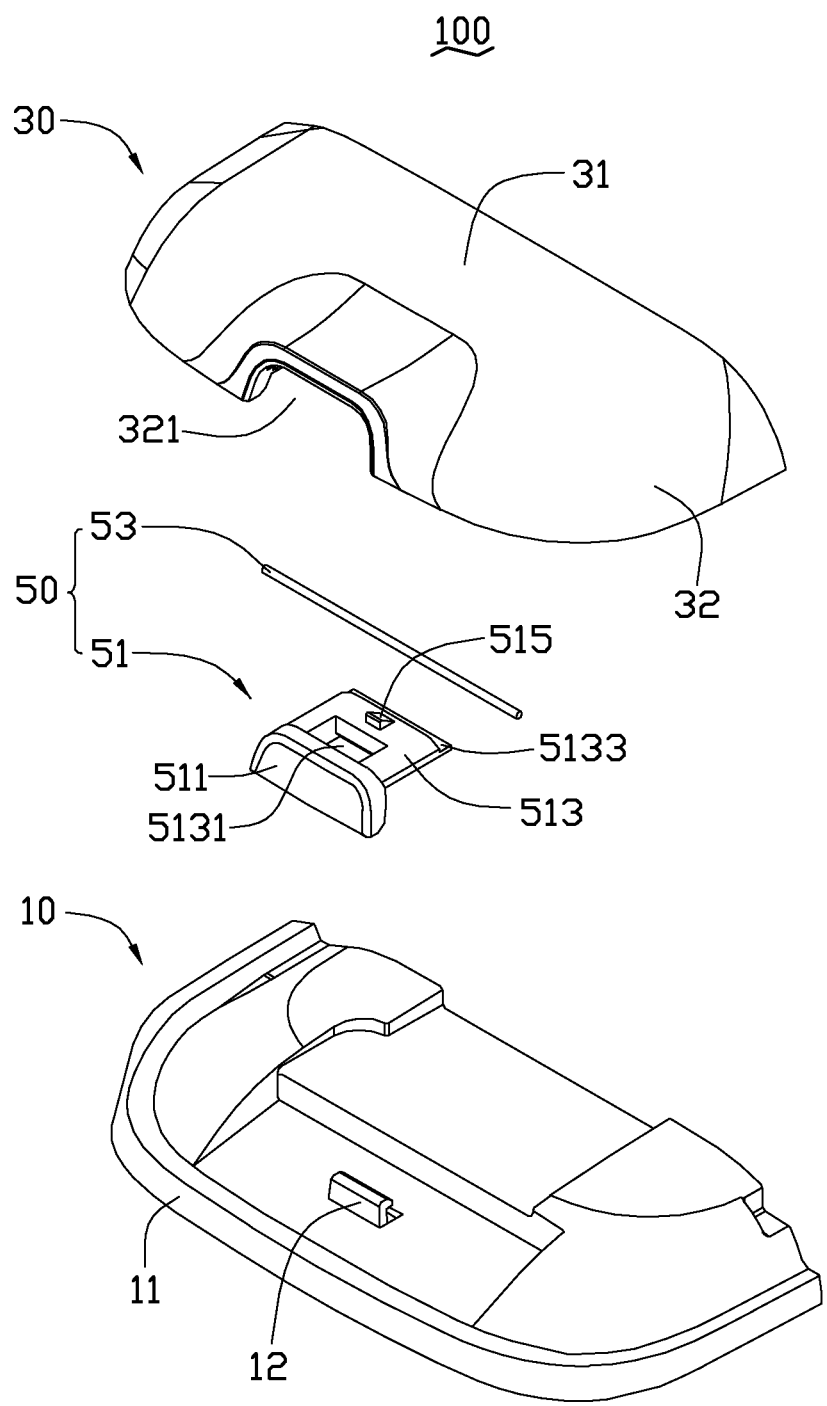
FIG. 2 is an exploded view of the battery cover latching mechanism shown in FIG. 1.
Figure 3:
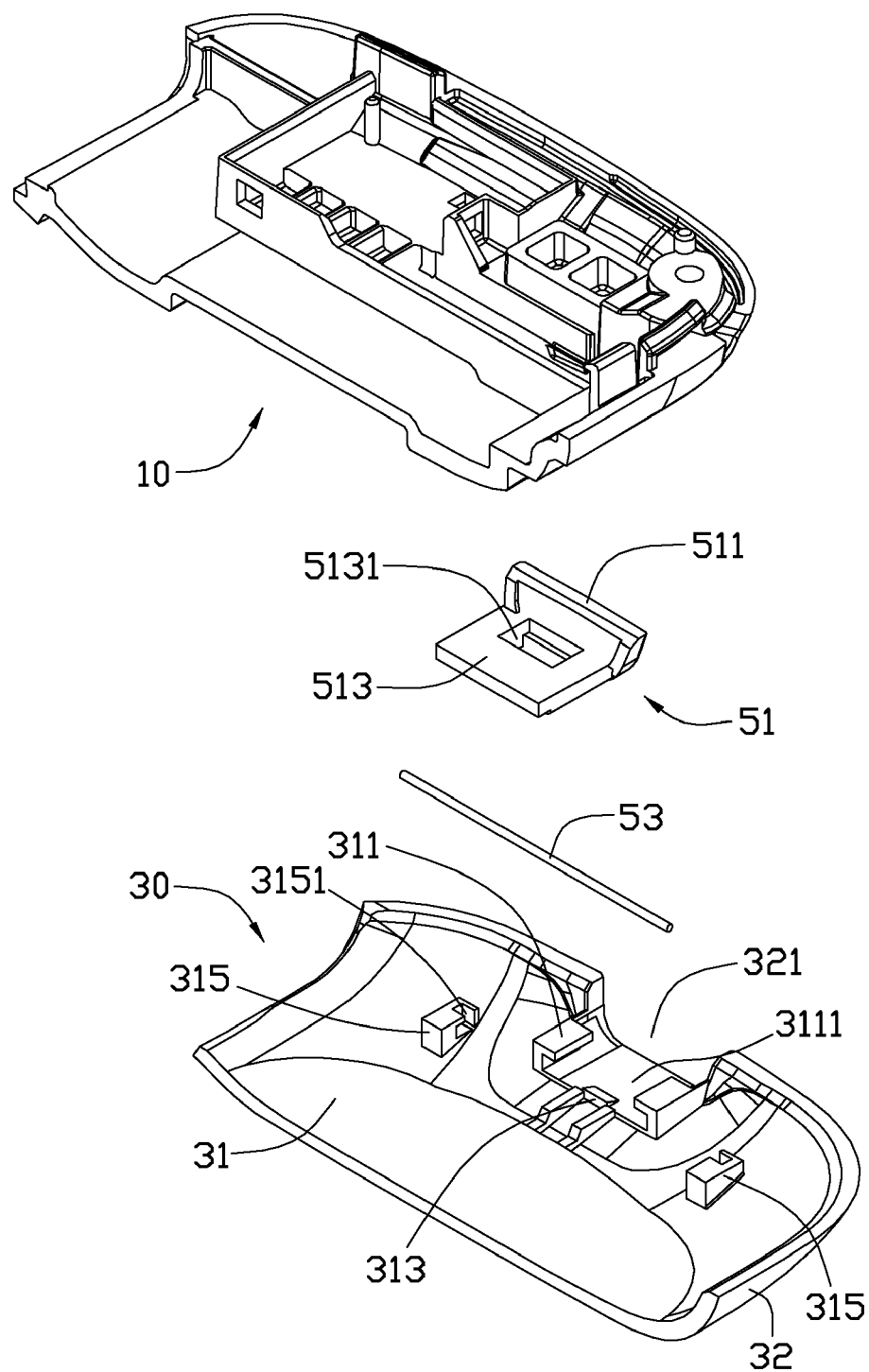
FIG. 3 is similar to FIG. 2, but viewed from another angle.

FIG. 1 to FIG. 3 show a portable electronic device including a battery cover latch mechanism 100. The battery cover latch mechanism 100 includes a housing 10, a battery cover 30, and a latching part 50.

The housing 10 includes a main body 11 and a wedge-shaped clasp 12 positioned on an end of the main body 11.

The battery cover 30 includes a bottom wall 31 and a peripheral wall 32 extending around the peripheral edge of the bottom wall 31. The peripheral wall 32 defines an opening 321 corresponding to the clasp 12. The bottom wall 31 includes a guiding portion 311, a resisting block 313, and two protruding blocks 315. The guiding portion 311 protrudes from the bottom wall 31 and aligns with the opening 321. The guiding portion 311 defines a through guiding slot 3111 communicating with the opening 321. The resisting block 313 protrudes from a bottom surface of the guiding slot 311 and is received in the guiding slot 3111. The resisting block 313 resists the latching part 50. The protruding blocks 315 are attached to the bottom wall 311 on two sides of the resisting block 313. Each of the protruding blocks 315 defines a L-shaped latching slot 3151. The latching slots 3151 face each other.

The latching part 50 includes a button 51 and a resilient bar 53 assembled within the button 51. The button 51 includes an operation portion 511, a latching plate 513 extending substantially perpendicularly from the operation portion 511, and a triangular hook 515 secured on the latching plate 513. The operation portion 511 is slidable within the opening 321. The latching plate 513 defines a latching hole 5131 therethrough, and includes an extending plate 5133 extending from a distal end of the latching plate 513. The extending plate 5133 is thinner than the latching plate 513. The hook 515 is positioned between the extending plate 5133 and the latching hole 5131.

The resilient bar 53 is generally cylindrical and can be made of metallic materials. The resilient bar 53 is capable of providing an elastic force to the movement of the button 51.

Figure 4:
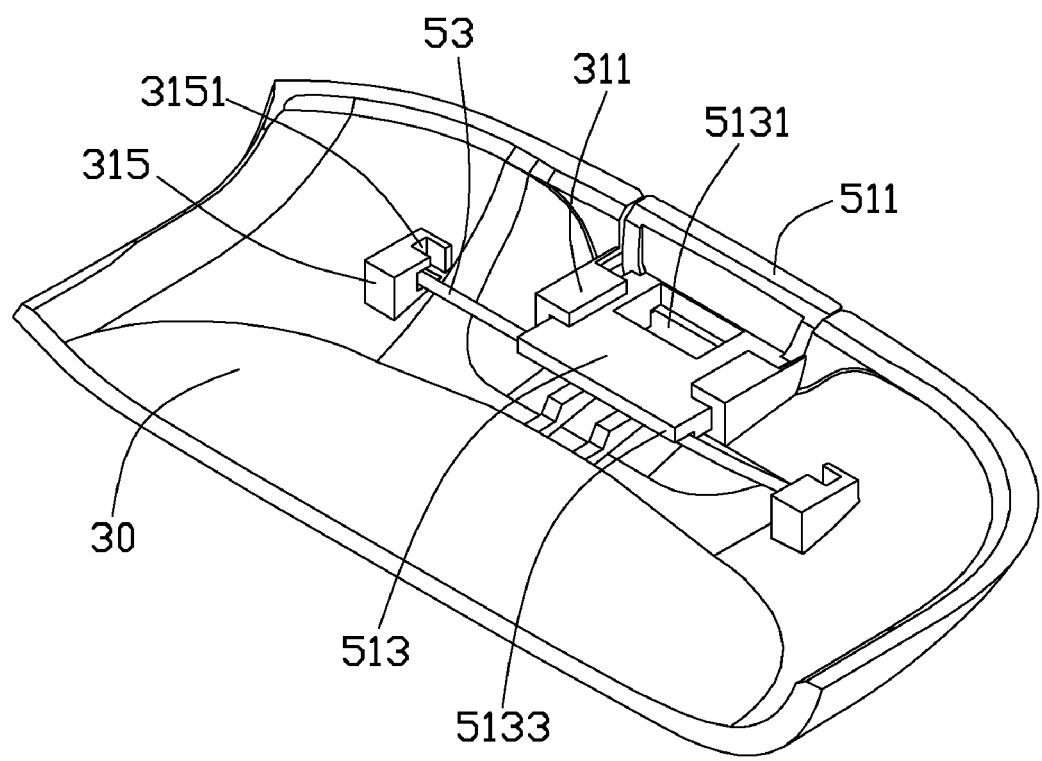
FIG. 4 is similar to FIG. 1, but viewed from another angle.

Referring to FIG. 4, to assemble the battery cover latch mechanism 100, the resilient bar 53 is latched into the latching slot 3151. The latching plate 513 is slidably assembled into the guiding slot 3111. The operation portion 511 is received into the opening 321. At this case, the resilient bar 53 resists the latching plate 513 and the extending plate 5133. The hook 515 resists the resisting block 313. Thus, the latching part 50 is assembled with the battery cover 30. The operation portion 511 is pushed by an external force further into the opening 321, the button 51 moves towards the resisting block 313 to bias the resilient bar 53. The resilient bar 53 is elastically deformed. The battery cover 30 covers the main body 11 and the clasp 12 passes through the latching hole 5131. When the external force is released, the button 51 returns to original position by impelling of the resilient bar 53. The clasp 12 latches to the latching plate 513. Thus, the battery cover 30 is latched to the housing 10.

Figure 5:
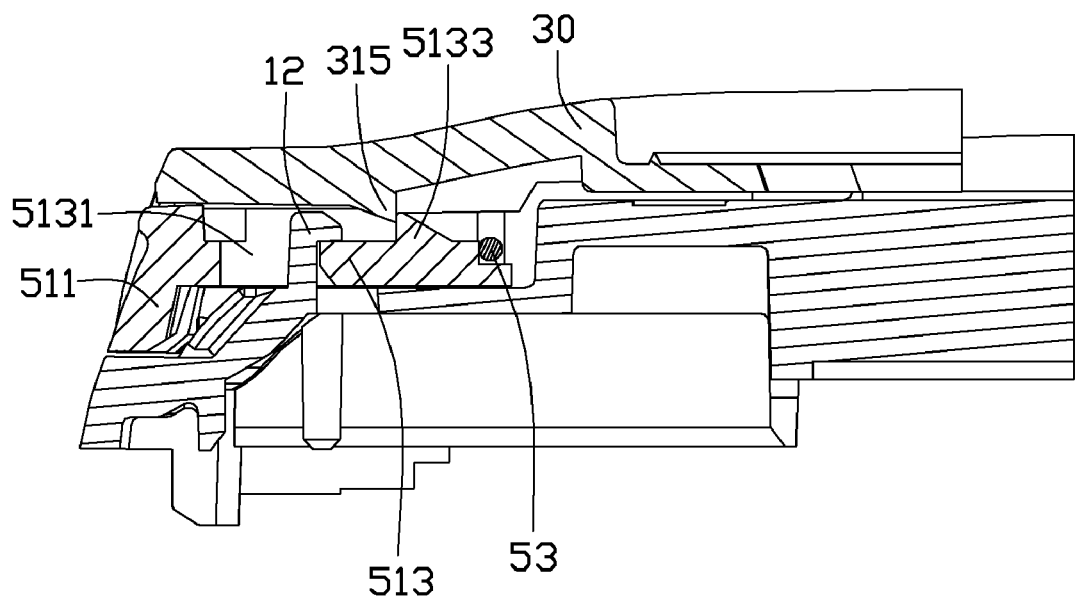
FIG. 5 is a cross sectional view of the battery cover latching mechanism taken along line V-V.

Referring to FIG. 5, to open the battery cover 30, the operation portion 511 is pushed again by an external force, the latching plate 513 slides within the guiding slot 3111 and deforms the resilient bar 53. When the clasp 12 detaches from the latching plate 513, the battery cover 30 can be removed from the housing 10.

The battery cover 30 can be attached/detached from the housing 10 by the operation of the battery cover latch mechanism 100, which is simple in structure and easy to operate.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising:
   a housing including a clasp positioned thereon;
   a battery cover including a guiding portion and a resisting block facing the guiding portion, the guiding portion and the resisting block integrally formed with the battery cover, the guiding portion defining a guiding slot; and
   a latching part including a button and a resilient bar;
   the button including a latching plate and a hook, the latching plate slidably received in the guiding slot, the hook resisting the resisting block;

wherein the button slidably and releasably latches to the clasp to lock the battery cover to the housing or release the battery cover from the housing.

2. The battery cover latch mechanism as claimed in claim 1, wherein the button comprises an operation portion, the latching plate extends from the operation portion, the latching plate defines a latching hole, the clasp is integrally formed on the housing, the clasp passes through the latching hole and latches to the latching plate.

3. The battery cover latch mechanism as claimed in claim 2, wherein the resilient bar is a cylindrical pole, opposite ends of the resilient bar is mounted on the battery cover, and a middle portion of the resilient bar resists one end of the latching plate.

4. The battery cover latch mechanism as claimed in claim 3, wherein the latching plate comprises an extending plate extending from a free end of the latching plate, the extending plate is thinner than the latching plate, the middle portion of the resilient bar resists a junction of the latching plate and the extending plate.

5. The battery cover latch mechanism as claimed in claim 4, wherein the battery cover further comprises two protruding blocks positioned on two sides of the resisting block, the opposite ends of the resilient bar are fixed on the protruding blocks.

6. The battery cover latch mechanism as claimed in claim 5, wherein each of the protruding blocks defines an L-shaped latching slot facing each other, the resilient bar is fixed in the latching slot.

7. The battery cover latch mechanism as claimed in claim 1, wherein the resilient bar is made of metal.

8. The battery cover latch mechanism as claimed in claim 7, wherein the resilient bar is made of spring steel.

* * * * *